(12) United States Patent
Nogami et al.

(10) Patent No.: US 8,980,985 B2
(45) Date of Patent: Mar. 17, 2015

(54) TEMPORARY FIXING COMPOSITION

(75) Inventors: Yasutoshi Nogami, Tokyo (JP);
Manabu Kirino, Tokyo (JP);
Yoshimune Shundoh, Tokyo (JP);
Shinya Kodaira, Tokyo (JP)

(73) Assignee: Three Bond Fine Chemical Co., Ltd. (JP)

( * ) Notice: Subject to any disclaimer, the term of this patent is extended or adjusted under 35 U.S.C. 154(b) by 60 days.

(21) Appl. No.: 13/518,750

(22) PCT Filed: Dec. 2, 2010

(86) PCT No.: PCT/JP2010/071584
§ 371 (c)(1),
(2), (4) Date: Aug. 2, 2012

(87) PCT Pub. No.: WO2011/077922
PCT Pub. Date: Jun. 30, 2011

(65) Prior Publication Data
US 2012/0316285 A1    Dec. 13, 2012

(30) Foreign Application Priority Data

Dec. 24, 2009    (JP) .................... 2009-293052

(51) Int. Cl.
C08L 23/24    (2006.01)
C09J 123/24    (2006.01)

(52) U.S. Cl.
CPC ..................... *C09J 123/24* (2013.01)
USPC ........................................... 524/474

(58) Field of Classification Search
CPC ....................................... C09J 123/24
USPC ......................................... 524/474
See application file for complete search history.

(56) References Cited

U.S. PATENT DOCUMENTS

| 2004/0185243 A1 | 9/2004 | Kakinuma et al. |
| 2008/0149270 A1 | 6/2008 | Oshima et al. |
| 2011/0265934 A1 | 11/2011 | Oshima et al. |

FOREIGN PATENT DOCUMENTS

| JP | 07-224270 A | | 8/1995 |
| JP | 2004143420 A | | 5/2004 |
| JP | 2004186398 A | * | 7/2004 |
| JP | 2004284575 A | | 10/2004 |
| JP | 2006290957 A | | 10/2006 |
| JP | 2007119634 A | | 5/2007 |

OTHER PUBLICATIONS

English Translation of JP 2004-186398. Obtained at http://wwwl 9.ipdl.inpit.go.jp/PA1/cgi-bin/PA1 Detail on Oct. 9, 2013.*

* cited by examiner

*Primary Examiner* — Ling Choi
*Assistant Examiner* — Lanee Reuther
(74) *Attorney, Agent, or Firm* — Fox Rothschild LLP; Peter J. Butch, III; Robert N Henrie, II (57) ABSTRACT

In the past, it was difficult to fix an adherend sufficiently during polishing processing and to peel off the adherend conveniently.
Provided is a non-reactive temporary fixing composition for plane polishing having a shear stress strength of not less than 0.05 MPa and a normal stress strength of less than 100 N.

6 Claims, 3 Drawing Sheets

TEMPORARY FIXING COMPOSITION

TECHNICAL FIELD

The present invention relates to a non-reactive resin composition that is suitable for temporary fixing of an adherend in plane polishing processing.

BACKGROUND ART

The side chain crystalline polymers seen in Patent Literature 1 have been conventionally known as raw materials having thermosensitivity. These raw materials are used as thermal transfer recording media. Specifically, they enable high-speed printing by phase change of solid-liquid-solid in a short time period. A solvent having a low viscosity and paraffin are added to a composition by approximately 90% by weight of the total weight so as to give a coating material that is a liquid at 25° C. The composition is used by drying under heating.

Temporary fixing compositions that are used for plane polishing processing of silicon wafers, sapphire glass, ceramic materials, optical glass, crystals, magnetic materials and the like (hereinafter referred to as wafers and the like) are known. As the above-mentioned temporary fixing compositions, hot-melt type temporary fixing compositions and the like are used. When a hot-melt type resin is applied, the resin is applied on an adherend in a molten state by heating, and a heating step is also required for peeling off the resin after the polishing operation is completed.

The techniques described in Patent Literatures 2 and 3 are known as techniques for improving the workability of conventional temporary fixing compositions. The composition in Patent Literature 2 is a composition having a polyether backbone such as ethylene oxide, and is not dissolved in water at an ordinary temperature but is dissolved in warm water. On the other hand, the temporary fixing agent in Patent Literature 3 contains a resin composition that is cured by active energy ray, which can peel off the wafer after being dissolved in warm water of 90° C. In these temporary fixing compositions, it is necessary to apply the temporary fixing composition on each adherend, and a step of removing the adherend by immersing in warm water is also required. As a matter of course, the used temporary fixing composition must be disposed of. Finally, it is necessary to dispose of the warm water contaminated with chemical substances or subject the warm water to a sewage treatment.

PRIOR ART LITERATURE

Patent Literature

Patent Literature 1: JP-A-2007-119634
Patent Literature 2: JP-A-7-224270
Patent Literature 3: JP-A-2006-290957

SUMMARY OF INVENTION

Problem to be solved by the Invention

In the past, it was difficult to fix an adherend sufficiently during polishing processing and to peel off the adherend easily.

Solution to Solve Problem

The present inventors have done intensive studies so as to attain the above-mentioned object, and consequently completed the present invention based on a means relating to a temporary fixing composition containing a thermoplastic resin by polymerizing only an α-olefin having 16 to 35 carbon atoms as an essential component.

The gist of the present invention will be explained below. The first embodiment of the present invention is a non-reactive temporary fixing composition for plane polishing having a shear stress strength of not less than 0.05 MPa and a normal stress strength of less than 100 N.

The second embodiment of the present invention is the temporary fixing composition for plane polishing according to the first embodiment, which contains component (A) as an essential component, and further contains 0 to 30 parts by mass of component (B) with respect to 100 parts by mass of the component (A) and/or 0 to 80 parts by mass of component (C) with respect to 100 parts by mass of the component (A):

the component (A) being a thermoplastic resin by polymerizing only an α-olefin having 16 to 35 carbon atoms;

the component (B) being a thermoplastic resin, a thermoplastic elastomer or a rubber elastomer, and being solid at 25° C., other than the component (A) and constituted by a hydrocarbon; and the component (C) being a hydrocarbon compound that is liquid at 25° C. and has a viscosity of 1 to 1,000 mPa·s at 25° C.

The third embodiment of the present invention is the temporary fixing composition for plane polishing according to the second embodiment, which further contains 0.1 to 30 parts by mass of the component (B) with respect to 100 parts by mass of the component (A) and/or 1 to 100 parts by mass of the component (C) with respect to 100 parts by mass of the component (A).

The fourth embodiment of the present invention is the temporary fixing composition for plane polishing according to any of the first to third embodiments, which has a melt viscosity of 1 to 500 mPa·s at 100° C.

Advantageous Effects of Invention

When the temporary fixing composition of the present invention is used, the adherend does not drop off since the strength in the shear direction is retained during polishing processing. When the adherend is peeled off after the processing, the adherend can be peeled off from an object easily and cleanly without destroying or deforming the adherend, without an extra step such as immersion in warm water.

EMBODIMENTS OF THE INVENTION

Polishing processing mainly refers to chemical mechanical polishing, and is a technique to obtain a smooth polished surface at a high speed by: increasing a mechanical polishing (surface removal) effect, that is, the relative motion between a polisher and an object to be polished, by the surface chemical effect that the polisher (abrasive grain) itself has, or by the effect of a chemical component included in a polishing slurry. This is also described as chemistry-mechanical polishing, chemical-machine polishing, chemical-mechanical polishing or CMP.

The temporary fixing in the present invention means that an adherend such as a wafer is fixed so as not to drop off against the force in the shear direction during the polishing processing. The temporary fixing is conducted by a non-reactive composition that is constituted by raw materials having no reactive functional groups. The wafer or the like after polishing has a thickness of 50 to 200 μm, more preferably 150 to 200 μm. Since no stress is generated in the adherend, the present invention can also be applied to polishing of a wafer or the like having a thickness of less than 100 μm.

The details of the present invention will be explained below. Although the specific composition of the composition of the present invention is not specifically limited, it is preferable that the composition contains the above-mentioned component (A) as an essential component. As the component (A) that can be used in the invention, a polymer obtained by polymerizing an α-olefin having 16 to 35 carbon atoms (hereinafter referred to as a higher olefin) can be used. Examples of the higher olefin may include 1-hexadecene, 1-heptadecene, 1-octadecene, 1-nonadecene, 1-eicosene and the like. Among these, one or two or more can be used. In the case when the α-olefin has 16 or more carbon atoms, the polymer tends to have high crystallinity and improved hardness. Alternatively, in the case when the α-olefin has 35 or less carbon atoms, the polymer tends to have a narrow temperature range of melting and crystallization and to be homogeneous. Specific examples of the component (A) may include, but are not limited to, L-CRYSTA series manufactured by Idemitsu Kosan Co., Ltd. Although the method for the production of the component (A) is not specifically limited, the component can be produced, for example, by using a metallocene-based catalyst according to the method described in JP-A-2005-75908 or WO2003/070790.

For the composition of the present invention, only the component (A) can be used alone, or the above-mentioned component (B) and/or component (C) may further be added to the component (A) as an essential component so as to adjust the melt viscosity, shear stress strength and normal stress strength of the composition. Namely, the component (B) may be suitably added to the component (A), the component (B) and component (C) may be suitably added to the component (A), or the component (C) may be suitably added to the component (A).

Examples of the component (B) that can be used in the present invention may include a thermoplastic resin, a thermoplastic elastomer, a rubber elastomer and the like which are constituted by carbon and hydrogen and are solids at 25° C., and they may contain not only saturated bonds but also unsaturated bonds. Most preferably, the component (B) that is constituted by only hydrocarbon is preferable. It is preferable that the component (B) has a softening point of, but not limited to, 70 to 110° C. Examples of the component (B) that can be used in the invention may include elastomers formed by copolymerization of α-olefins such as ethylene, propylene, 1-butene, 1-pentene, 1-octene and the like, or, those called as elastomers or plastomers formed by copolymerization of these α-olefins and cycloolefins, styrene-based monomers, non-conjugated dienes, and the like. Examples of the non-conjugated dienes may include, but are not limited to, dicyclopentadiene, 1,4-hexadiene, dicyclooctadiene, methylenenorbornene, 5-ethylidene-2-norbornene and the like.

Further specific examples of the component (B) may include amorphous elastic copolymers containing olefins as main components such as an ethylene-propylene copolymer elastomer, an ethylene-1-butene copolymer elastomer, an ethylene-propylene-1-butene copolymer elastomer, an ethylene-1-hexene copolymer elastomer, an ethylene-1-octene copolymer elastomer, an ethylene-styrene copolymer elastomer, an ethylene-norbornene copolymer elastomer, a propylene-1-butene copolymer elastomer, an ethylene-propylene-non-conjugated diene copolymer elastomer, an ethylene-1-butene-non-conjugated diene copolymer elastomer and an ethylene-propylene-1-butene-non-conjugated diene copolymer elastomer. Among these, polymers containing olefins having 2 to 8 carbon atoms as a main constitutional unit are preferable, and copolymers containing ethylene units as a main constitutional unit are more preferable.

Specific examples of the component (B) may include, but are not limited to, thermoplastic aromatic hydrocarbon-based resins (for example, I-MARV P100 manufactured by Idemitsu Kosan Co., Ltd.), thermoplastic polyolefin-based resins (for example, PARAFINWAX-115 and PARAFINWAX-155 manufactured by Nippon Seiro Co., Ltd., and the like), thermoplastic microcrystalline-based resins (for example, HI-MIC-1090 manufactured by Nippon Seiro Co., Ltd., and the like), and the like.

In the case when the component (B) is added, the component (B) is added by preferably 0.1 to 30 parts by mass, more preferably 0.1 to 10 parts by mass, with respect to 100 parts by mass of the component (A). When the addition amount of the component (B) is less than 0.1 parts by mass with respect to 100 parts by mass of the component (A), strength sometimes becomes insufficient. On the other hand, when the addition amount of the component (B) is more than 30 parts by mass with respect to 100 parts by mass of the component (A), the melt viscosity is too high, and the normal stress strength is also too high and peeling is sometimes impossible.

The component (C) that can be used in the present invention is a hydrocarbon compound that is a liquid at 25° C. and has a viscosity of 1 to 1,000 mPa·s at 25° C. Specifically, it refers to a component that can be used as a solvent, a plasticizer, a lubricant or a detergent. Compounds having a polar group such as a hydroxyl group, a carboxyl group and an ester group are not suitable since they are not compatible with the component (A) and component (B).

Specific examples of the component (C) may include, but are not limited to, isoparaffin-based hydrocarbons (for example, IP SOLVENT series manufactured by Idemitsu Kosan Co., Ltd.), paraffin-based oils (for example, PS-32 manufactured by Idemitsu Kosan Co., Ltd.), paraffin-based hydrocarbons (for example, AQUASOLVENT Z series manufactured by Aqua Chemical Co., Ltd.) and the like.

In the case when the component (C) is added, the component (C) is added by preferably 1 to 100 parts by mass, more preferably 1 to 80 parts by mass, with respect to 100 parts by mass of the component (A). When the addition amount of the component (C) is less than 1 part by mass with respect to 100 parts by mass of the component (A), the viscosity is sometimes increased. On the other hand, when the addition amount of the component (C) is more than 100 parts by mass with respect to 100 parts by mass of the component (A), the viscosity is decreased and is sometimes too low. When the component (C) has a viscosity of higher than 1,000 mPa·s at 25° C., the melt viscosity is not decreased. The component (A) and component (C) can be mixed at a preferable ratio, and the component (B) can be suitably added to the composition of the component (A) and component (C).

Specific examples of materials to be polished may include, but are not limited to, optical glass (lenses, prisms, PBSs, optical filters), glass for electronic parts, quartz glass (synthesized quartz, molten quartz), crystal (crystal heat sinks, SAWs, optical low-pass filters), lithium niobate $LiNbO_3$, lithium tantalate $LiTaO_3$, magnesium oxide MgO, samarium-cobalt SmCo, neodymium-iron-boron NbFeB, ferrites (hard ferrite, soft ferrite), barium titanate $BaTiO_3$, potassium titanate, zirconia $ZrO_2$, silicon nitride $Si_3N_4$, aluminum nitride AlN, alumina $Al_2O_3$, sapphire, piezoelectric ceramics PZTs, machinable ceramics and the like.

The essential requirements of the temporary fixing composition of the present invention are that (1) the composition has a shear stress strength of not less than 0.05 MPa, and (2) the composition has a normal stress strength of less than 100 N. With respect to (1), if the composition has a shear stress strength of not less than 0.05 MPa, it is suitable for temporary fixing of an adherend. With respect to (2), if the composition has a normal stress strength of less than 100 N, it can be peeled off easily. On the other hand, in the case when the temporary fixing composition has a normal stress strength of not less than 100 N, the adherend may be broken unless the temporary fixing composition is peeled off by melting. The normal stress strength is more preferably less than 50 N.

It is preferable that the temporary fixing composition of the present invention is a solid at a room temperature, and may have various forms such as a powder, a mass and a rod shape during handling. The adherend is attached with the temporary fixing composition, the temporary fixing composition is used in a molten state. In addition, it is preferable that the temporary fixing composition has a melt viscosity (for example, as a value at 100° C.) of 1 to 500 mPa·s during handling. In the case when the melt viscosity is 1 mPa·s or less, the temporary fixing composition concentrates due to surface tension. On the other hand, when the melt viscosity is not less than 500 mPa·s, the stickiness is too high, and the composition threads and thus is difficult to be handled.

The temporary fixing composition of the present invention can be mixed with additives in an appropriate amount unless the intended effect of the present invention is not deteriorated. The additives may include colorants such as pigment and dyes, inorganic fillers such as metal powders, calcium carbonate, talc, silica, alumina and aluminum hydroxide, flame retarders, organic fillers, plasticizers, antioxidants, defoaming agents, silane-based coupling agents, leveling agents, and rheology-controlling agents may be incorporated by a suitable amount. By adding these, the temporary fixing composition that is excellent in resin strength, adhesion strength, workability, storage property and the like can be obtained.

EXAMPLES

Next, the present invention will further be explained in detail with referring to Examples, but the present invention is not construed to be limited to only these Examples.

Examples 1 to 17 and Comparative Examples 1 to 12

The following components were prepared for preparing the temporary fixing compositions. The details were summarized in Table 1.

Component (A): a thermoplastic resin by polymerizing from only an α-olefin having 16 to 35 carbon atoms A thermoplastic resin having a melting point of 70° C. (L-CRYSTA 7100, manufactured by Idemitsu Kosan Co., Ltd.)

A thermoplastic resin having a melting point of 40° C. (L-CRYSTA 4100, manufactured by Idemitsu Kosan Co., Ltd.) Component (B): a thermoplastic resin other than the component (A) which is a solid at 25° C. and is constituted by hydrocarbon A thermoplastic aromatic hydrocarbon-based resin (1-MARV P100, manufactured by Idemitsu Kosan Co., Ltd.)

A thermoplastic polyolefin-based resin (PARAFINWAX-115, manufactured by Nippon Seiro Co., Ltd.)

A thermoplastic polyolefin-based resin (PARAFINWAX-155, manufactured by Nippon Seiro Co., Ltd.)

A thermoplastic microcrystalline-based resin (HI-MIC-1090, manufactured by Nippon Seiro Co., Ltd.) Component (C): a hydrocarbon compound that is a liquid at 25° C. and has a viscosity of 1 to 1,000 mPa·s at 25° C.

A hydrocarbon compound having a viscosity of 350 mPa·s (25° C., type BH viscometer) (a liquid paraffin, manufactured by Taisei Chemical Co., Ltd.)

A hydrocarbon compound having a viscosity of 50 mPa·s (25° C., type BH viscometer) (DIANA PROCESS PS32, manufactured by Idemitsu Kosan Co., Ltd.)

A hydrocarbon compound having a viscosity of 25 mPa·s (25° C., type BH viscometer) (IP SOLVENT 2835, manufactured by Idemitsu Kosan Co., Ltd.)

Component (C'): a hydrocarbon compound that is a liquid at 25° C. and has a viscosity of not less than 1,000 mPa·s at 25° C.

A hydrocarbon compound having a viscosity of 100,000 mPa·s (25° C., type BL viscometer) (NISSEKI POLYBUTENE HV300, manufactured by Nippon Oil Corporation)

The component (A) is molten by heating. The melting temperature is suitably adjusted for each material. The component (B) is added to the molten component (A), and the mixture is stirred for 15 minutes until the mixture turns to be homogeneous. Thereafter the component (C) or component (C') is added thereto, and the mixture is further stirred for 15 minutes. In the case when the component (B) is not used, the component (C) or component (C') is added to the molten component (A), and the mixture is stirred for 15 minutes until the mixture turns out to be homogeneous. The detailed amounts for the preparation follow Table 1, and all of the numerical values are represented by parts by mass.

TABLE 1

| Raw materials | Example 1 | Example 2 | Example 3 | Example 4 | Example 5 | Example 6 | Example 7 | Example 8 | Example 9 |
|---|---|---|---|---|---|---|---|---|---|
| L-CRYSTA C-7100 | 100 | | 100 | 100 | 100 | 100 | 100 | | |
| L-CRYSTA C-4100 | | 100 | | | | | | 100 | 100 |
| I-MARV P100 | | | | | | | | | |
| PARAFINWAX-115 | | | | | | | | | |
| PARAFINWAX-155 | | | | | | | | | |
| HI-MIC-1090 | | | | | | | | | |
| Liquid paraffin | | | 5 | 1 | | | | | |
| DIANA PROCESS PS32 | | | | | | | | | |
| IP SOLVENT 2835 | | | | | 30 | 15 | 7.5 | 15 | 7.5 |
| NISSEKI POLYBUTENE HV300 | | | | | | | | | |
| Total | 100.0 | 100.0 | 105.0 | 101.0 | 130.0 | 115.0 | 107.5 | 115.0 | 107.5 |

| Raw materials | Example 10 | Example 11 | Example 12 | Example 13 | Example 14 | Example 15 | Example 16 |
|---|---|---|---|---|---|---|---|
| L-CRYSTA C-7100 | 100 | | 100 | 100 | 100 | 100 | 100 |
| L-CRYSTA C-4100 | | 100 | | | | | |
| I-MARV P100 | 10 | 10 | 3 | 3 | 3 | 20 | 20 |
| PARAFINWAX-115 | | | | | | | |
| PARAFINWAX-155 | | | | | | | |
| HI-MIC-1090 | | | | | | | |
| Liquid paraffin | | | 3 | 10 | | | |
| DIANA PROCESS PS32 | | | 10 | | | | |
| IP SOLVENT 2835 | | | | | | 30 | 50 |
| NISSEKI POLYBUTENE HV300 | | | | | | | |
| Total | 110.0 | 110.0 | 116.0 | 113.0 | 103.0 | 150.0 | 170.0 |

| Raw materials | Example 17 | Comparative Example 1 | Comparative Example 2 | Comparative Example 3 | Comparative Example 4 | Comparative Example 5 | Comparative Example 6 |
|---|---|---|---|---|---|---|---|
| L-CRYSTA C-7100 | 100 | | | | | | |
| L-CRYSTA C-4100 | | | | | | | |
| I-MARV P100 | 30 | 100 | | | | 100 | 100 |
| PARAFINWAX-115 | | | 100 | | | | |
| PARAFINWAX-155 | | | | 100 | | | |
| HI-MIC-1090 | | | | | 100 | | |
| Liquid paraffin | | | | | | | |
| DIANA PROCESS PS32 | | | | | | | |
| IP SOLVENT 2835 | 50 | | | | | 30 | 10 |
| NISSEKI POLYBUTENE HV300 | | | | | | | |
| Total | 180 | 100.0 | 100.0 | 100.0 | 100.0 | 130.0 | 110.0 |

| Raw materials | Comparative Example 7 | Comparative Example 8 | Comparative Example 9 | Comparative Example 10 | Comparative Example 11 | Comparative Example 12 |
|---|---|---|---|---|---|---|
| L-CRYSTA C-7100 | | | | | 100 | 100 |
| L-CRYSTA C-4100 | | | | | | |
| I-MARV P100 | | | | 100 | 40 | 30 |
| PARAFINWAX-115 | 100 | | | | | |
| PARAFINWAX-155 | | 100 | | | | |
| HI-MIC-1090 | | | 100 | | | |
| Liquid paraffin | | | | | | |
| DIANA PROCESS PS32 | | | | | | |
| IP SOLVENT 2835 | 10 | 10 | 10 | | | 80 |
| NISSEKI POLYBUTENE HV300 | | | | 15 | | |
| Total | 110.0 | 110.0 | 110.0 | 115.0 | 140.0 | 210.0 |

For Examples 1 to 17 and Comparative Examples 1 to 12, melt viscosity, shear stress strength and normal stress strength were measured by the methods described below. The results of the measurements are summarized in Table 2.

[Finger Tack Test]

It is checked by touching with fingers whether the surface of the temporary fixing composition is sticky or a solid form at 25° C. If stickiness remains, the temporary fixing composition still has viscous, and the interface between the adherend and the temporary fixing composition cannot breakaway when the adherend is pulled off, and the temporary fixing composition remains on the adherend.

Fine: Not sticky

Not fine: Sticky

[Measurement of Melt Viscosity]

A measurement is conducted under the following conditions, and the viscosity at a 100° C. atmosphere is determined as "melt viscosity (mPa·s)". In the case when the result of the measurement exceeds the measurement limit of the lower limit value or upper limit value, it is represented as "lower limit value or less" or "upper limit value or more", respectively.

RVT manufactured by Brookfield (Brookfield Thermo Cell System)

Spindle: SC4-21

Rotating velocity: 100 rpm

Measurement temperature: 100° C.

[Measurement of Shear Stress Strength]

Figure 1:
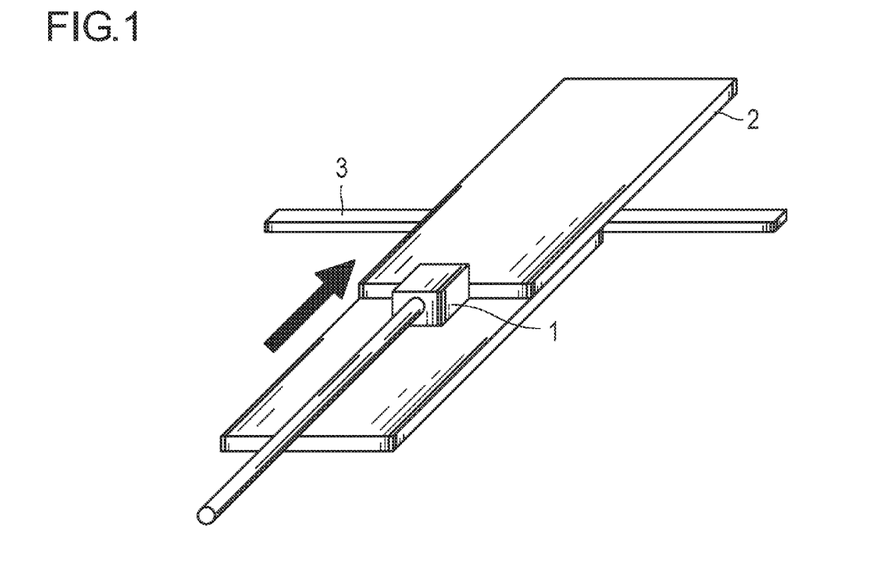
FIG. 1 is an explanatory drawing for explaining a method for measuring a shear stress strength.

The temporary fixing compositions of Examples 1 to 17 and Comparative Examples 1 to 12 are each applied to the following glass plates under heating, the glass plates are aligned, and attached each other. Thereafter the glass plates are fixed as shown in FIG. 1, a digital force gauge is moved at a predetermined mobile velocity, and the strength (N) at which the head of the digital force gauge is contacted with the glass plate in the shear direction against the adhesion surface is measured. The strength per an adhesion surface area ($m^2$) is determined as "shear stress strength (MPa)".

Glass plate: 5.0×25×100 mm

Adhesion area: 25×10 mm

Strength measurement apparatus: digital force gauge FGC-10 (manufactured by NIDEC-SIMPO Corporation)

Mobile velocity of strength measurement apparatus: 10 mm/min

[Measurement of Normal Stress Strength]

Figure 2:
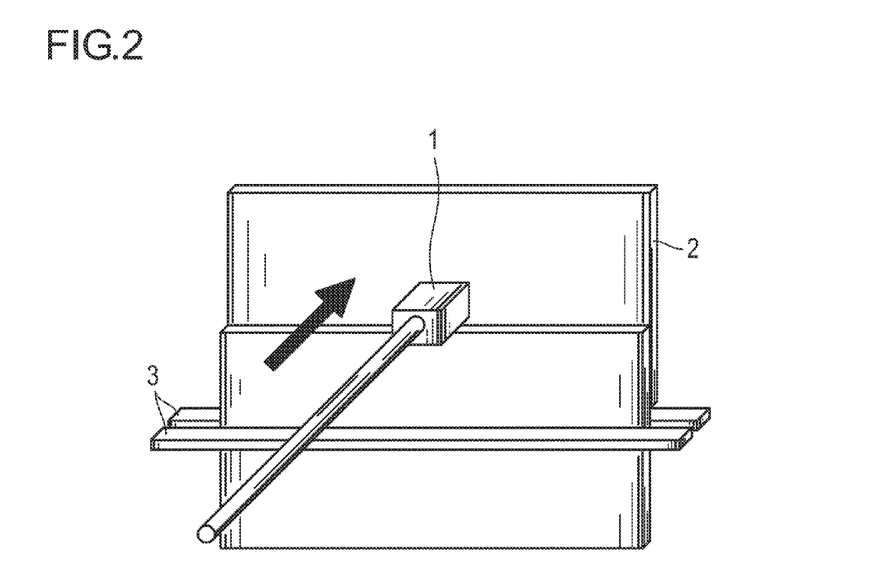
FIG. 2 is an explanatory drawing for explaining a method for measuring a normal stress strength.

The temporary fixing compositions of Examples 1 to 17 and Comparative Examples 1 to 12 are each applied to the following glass plates under heating, the glass plates are aligned, and attached each other. Thereafter the glass plates are fixed as shown in FIG. 2, a digital force gauge is moved at a predetermined mobile velocity, and the strength (N) at which the head of the digital force gauge is contacted with the glass plate in the peeling direction against the adhesion surface is measured. This strength is determined as "normal stress strength (N)".

Glass plate: 2.5×25×50 mm

Adhesion area: 15×50 mm

Strength measurement apparatus: digital force gauge FGC-10 (manufactured by NIDEC-SIMPO Corporation)

Mobile velocity of strength measurement apparatus: 50 mm/min

TABLE 2

| Tested items | Example 1 | Example 2 | Example 3 | Example 4 | Example 5 | Example 6 | Example 7 | Example 8 | Example 9 |
|---|---|---|---|---|---|---|---|---|---|
| Finger touch | Fine | Fine | Fine | Fine | Fine | Fine | Fine | Fine | Fine |
| Melt viscosity (mPa·s) | 200 | 200 | 180 | 190 | 100 | 125 | 150 | 125 | 150 |
| Shear stress strength (MPa) | 0.17 | 0.09 | 0.10 | 0.12 | 0.14 | 0.15 | 0.10 | 0.12 | 0.16 |
| Normal stress strength (N) | 39 | 27 | 42 | 43 | 34 | 35 | 30 | 48 | 41 |

| Tested items | Example 10 | Example 11 | Example 12 | Example 13 | Example 14 | Example 15 | Example 16 |
|---|---|---|---|---|---|---|---|
| Finger touch | Fine | Fine | Fine | Fine | Fine | Fine | Fine |
| Melt viscosity (mPa·s) | 250 | 250 | 160 | 180 | 210 | 200 | 180 |
| Shear stress strength (MPa) | 0.25 | 0.2 | 0.18 | 0.15 | 0.17 | 0.25 | 0.21 |
| Normal stress strength (N) | 45 | 42 | 38 | 37 | 32 | 29 | 40 |

| Tested items | Example 17 | Comparative Example 1 | Comparative Example 2 | Comparative Example 3 | Comparative Example 4 | Comparative Example 5 | Comparative Example 6 |
|---|---|---|---|---|---|---|---|
| Finger touch | Fine | Fine | Fine | Fine | Fine | Not fine | Fine |
| Melt viscosity (mPa·s) | 190 | Upper limit value or more | 2.5 | 7.5 | 15 | Lower limit value or less | 220 |
| Shear stress strength (MPa) | 0.22 | 0.41 | 0.22 | 0.28 | 0.36 | 0.01 or less | 0.50 |
| Normal stress strength (N) | 32 | 20 | 100 or more | 100 or more | 100 or more | 100 or more | 100 or more |

| Tested items | Comparative Example 7 | Comparative Example 8 | Comparative Example 9 | Comparative Example 10 | Comparative Example 11 | Comparative Example 12 |
|---|---|---|---|---|---|---|
| Finger touch | Fine | Fine | Fine | Fine | Fine | Not fine |
| Melt viscosity (mPa·s) | Lower limit value or less | Lower limit value or less | Lower limit value or less | 220 | Upper limit value or more | 150 |
| Shear stress strength (MPa) | 0.20 | 0.21 | 0.20 | 0.50 | 0.70 | 0.08 |
| Normal stress strength (N) | 100 or more | 100 or more | 100 or more | 100 or more | 50 | 50 |

A test to adjust the thickness after polishing to 200 μm in the polishing processing of sapphire glass was conducted. Examples, Examples 1 to 6, 9, 12 and 14 to 17, and Comparative Examples 6, 11 and 12 were used as a temporary fixing composition for the test. The tested items included three items: handling capability, workability and peeling capability.

The handling capability refers to easiness of handling when the temporary fixing composition is pressed to a fixing jig heated to 100° C. to form a coating film.

○: Fine
Δ: Handling is possible, but is not fine
x: Bad

The workability is a property whether or not the composition drops off when a weight in the shear direction is applied during polishing.
○: The composition does not drop off
Δ: The composition does not drop off, but the adherend is distorted
x: The composition drops off The peeling capability is a property of whether or not the adherend is peeled off cleanly when the adherend is pulled out at a room temperature after polishing is completed. The test results of the above-mentioned Examples are shown in Table 3.
○: The adherend is peeled off cleanly
Δ: The adherend can be peeled off but is not peeled off cleanly
x: The adherend cannot be peeled off

INDUSTRIAL APPLICABILITY

By adding the part that has been lost in operations of the temporary fixing composition of the present invention later, an adherend such as a wafer can be treated successively and the adherend can be pulled off easily without removing or heating the composition, and thus multiple steps are not necessary when the present invention is used. It can be said that the temporary fixing composition of the present invention is a temporary fixing composition that has fine handling capability, workability and peeling capability in polishing processing and is suitable for precise polishing processing.

The present application is based on the Japanese Patent Application No. 2009-293052 filed on Dec. 24, 2009, and the entirety of the disclosure thereof is cited herein by reference.

TABLE 3

| Tested items | Example 1 | Example 2 | Example 3 | Example 4 | Example 5 |
|---|---|---|---|---|---|
| Handling capability | Δ | Δ | Δ | Δ | ○ |
| Workability | ○ | ○ | ○ | ○ | ○ |
| Peeling capability | ○ | ○ | ○ | ○ | ○ |

| Tested items | Example 6 | Example 9 | Example 12 | Example 14 | Example 15 |
|---|---|---|---|---|---|
| Handling capability | ○ | ○ | Δ | Δ | ○ |
| Workability | ○ | ○ | ○ | ○ | ○ |
| Peeling capability | ○ | ○ | ○ | ○ | ○ |

| Tested items | Example 16 | Example 17 | Comparative Example 6 | Comparative Example 11 | Comparative Example 12 |
|---|---|---|---|---|---|
| Handling capability | ○ | ○ | ○ | X | ○ |
| Workability | ○ | ○ | Δ | ○ | X |
| Peeling capability | ○ | ○ | X | Δ | Δ |

When the normal stress strength is compared between Examples 1 to 17 and Comparative Examples 2 to 10 in Table 2, they are in the range of 27 to 45 in Examples whereas 100 or more is shown in Comparative Examples. This shows that the normal stress strength is too strong and pulling out at an ordinary temperature is difficult in Comparative Examples. On the other hand, with respect to the shear stress strength, according to Table 3, polishing processing is not affected adversely when the composition does not drop off in the test of workability and the shear stress strength is not less than 0.05 MPa. The shear stress strength is strong as 0.5 in Comparative Example 6 of Table 2, but these results in distortion of the adherend as shown in Table 3. In the case when the finger tack test is not fine as in Comparative Example 5 and Comparative Example 12 of Table 2, it is possible that the position of the adherend is misaligned in polishing processing in the compositions having stickiness. Even the composition is composed of the components (A) to (C) of the present invention, when the component (B) is added too much as in Comparative Example 11, the melt viscosity is too high and the composition is too viscous when melting, and thus the handling capability in Table 3 is poor. When the component (C) is added too much as in Comparative Example 12, shear stress strength is fine but a problem is caused in the workability during polishing processing.

REFERENCE SIGNS LIST

Figure 3:
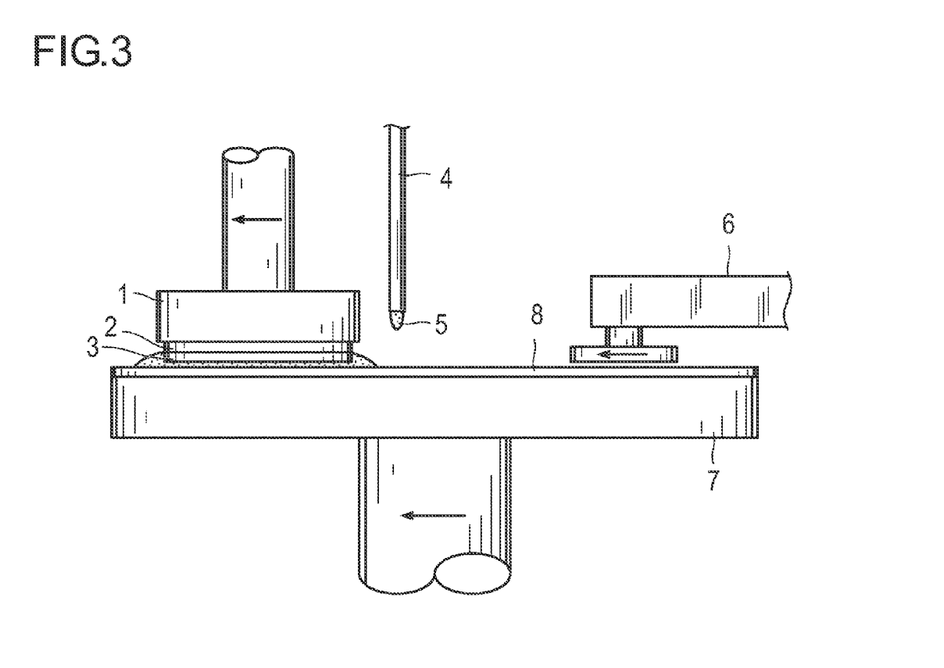
FIG. 3 is a side view of a specific example of chemical mechanical polishing, but the polishing method is not limited to this example.
Figure 4:
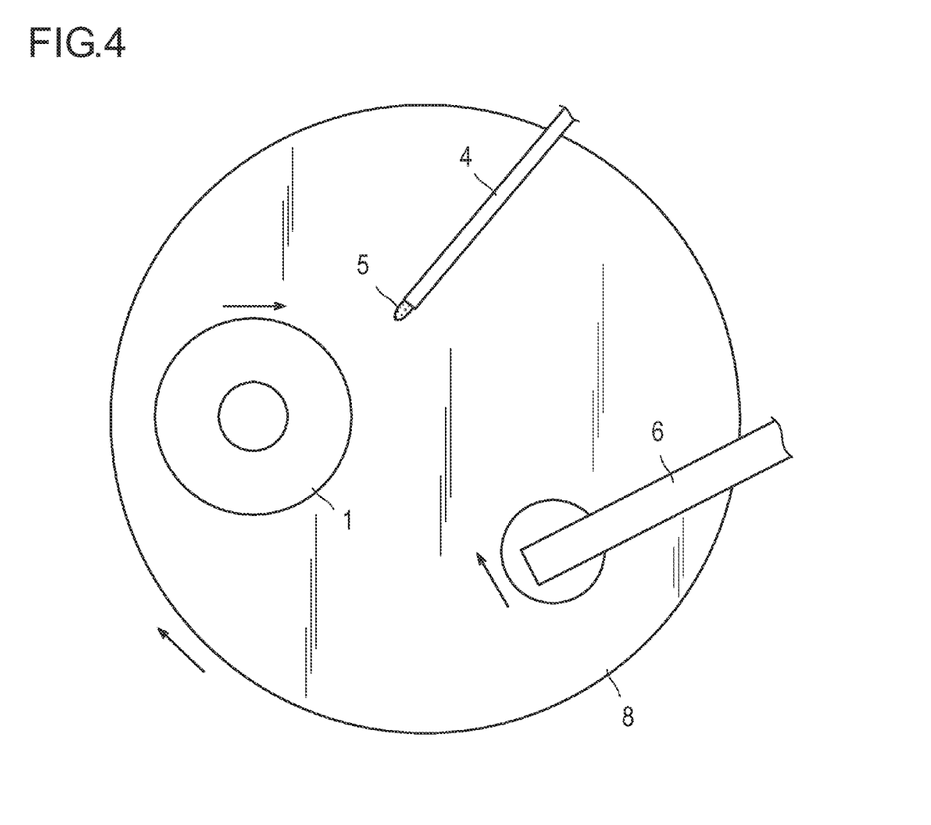
FIG. 4 is a top view of FIG. 3.

FIG. 1 and FIG. 2 follow the below symbols.
1: Head of digital force gauge that moves at a constant velocity (main body is abbreviated)
2: Temporarily-fixed glass plate
3: Fixing jig FIG. 3 and FIG. 4 follow the below symbols.
1: Carrier
2: Temporary fixing composition
3: Wafer (adherent)
4: Nozzle
5: Slurry
6: Pad conditioner
7: Platen
8: Pad

The invention claimed is:
1. A non-reactive temporary fixing composition for plane polishing having a shear stress strength of not less than 0.05 MPa and a normal stress strength of less than 100 N per adhesion area of 15 mm×50 mm, comprising:
 (A) a thermoplastic resin consisting of α-olefin monomer units having 16-35 carbon atoms; and
 (B) a hydrocarbon component selected from the group consisting of thermoplastic resins other than the compo- nent (A), thermoplastic elastomers and rubber elastomers, wherein said hydrocarbon component is solid at 25° C.; and/or (C) a hydrocarbon compound that is liquid at 25° C. and has a viscosity of 1 to 1,000 mPa·s at 25° C.;

wherein component (B) is present in 0 to 30 parts by mass with respect to 100 parts by mass of component (A), and/or component (C) is present in 0 to 80 parts by mass with respect to 100 parts by mass of component (A).

2. The temporary fixing composition for plane polishing according to claim 1, which has a melt viscosity of 1 to 500 mPa·s at 100° C.

3. The temporary fixing composition for plane polishing according to claim 1, which composition is a non-sticky solid at 25° C.

4. A non-reactive temporary fixing composition for plane polishing having a shear stress strength of not less than 0.05 MPa and a normal stress strength of less than 100 N per adhesion area of 15 mm×50 mm, comprising:

(A) a thermoplastic resin consisting of poly-α-$C_{16}$-$C_{35}$-olefin; and (B) a hydrocarbon component selected from the group consisting of thermoplastic resins other than the component (A), thermoplastic elastomers and rubber elastomers, wherein said hydrocarbon component is solid at 25° C.; and/or (C) a hydrocarbon compound that is liquid at 25° C. and has a viscosity of 1 to 1,000 mPa·s at 25° C.;

wherein component (B) is present in 0.1 to 30 parts by mass with respect to 100 parts by mass of component (A), and/or component (C) is present in 1 to 80 parts by mass with respect to 100 parts by mass of component (A).

5. The temporary fixing composition for plane polishing according to claim 4, which has a melt viscosity of 1 to 500 mPa·s at 100° C.

6. The temporary fixing composition for plane polishing according to claim 4, which composition is a non-sticky solid at 25° C.

* * * * *